United States Patent [19]

Dorazio

[11] Patent Number: 5,082,480
[45] Date of Patent: Jan. 21, 1992

[54] CERAMIC FILTER
[75] Inventor: Raymond E. Dorazio, Wysox, Pa.
[73] Assignee: GTE Products Corporation
[21] Appl. No.: 632,796
[22] Filed: Dec. 24, 1990
[51] Int. Cl.$^5$ ............................................. B01D 46/00
[52] U.S. Cl. ............................. 55/523; 55/DIG. 30; 60/311
[58] Field of Search ................ 55/523, 466, DIG. 30; 60/311

[56] References Cited
U.S. PATENT DOCUMENTS
4,833,883 5/1989 Oda et al. .................... 55/DIG. 30

Primary Examiner—Bernard Nozick

[57] ABSTRACT

A cordierite ceramic filter structure of the type having a plurality of clean gas channels forming outlets at the one end thereof, a plurality inlet channels forming inlets on said side surfaces for gas to be filtered, and thin porous sections separating said inlet channels from the outlet channels for removing particulate from the gas to be filtered, wherein the filter structure includes a plurality of stacked filter elements with each of the elements comprising a pair of marginal serrated side portions and a plurality of ribs intermediate the marginal side portions with thin porous sections joining and extending therebetween wherein the marginal sections have a substantially uniform width of greater than about 1 inch which are interrupted by a vertically extending notch adjacent for mounting said filter structure to a housing.

4 Claims, 2 Drawing Sheets

CERAMIC FILTER

The work resulting in this invention was carried out under Contract Number #DE-AC21-86MC23250 and the U.S. Government has certain rights in the invention in accordance with the Patent Rights clause contained in that contract.

FIELD OF THE INVENTION

The invention relates to a porous ceramic filter of the type used to remove particulate from a combusted hydrocarbonaceous material.

BACKGROUND OF THE INVENTION

A filtration system for cleaning high temperature raw gas containing fine particulates such as that discharged from coal gasification and fluidized bed combustion processes is described in U.S. Pat. No. 4,343,631 to Cliberti. Plants that discharge raw product gas at temperatures in the range of 1200° F. to 1800° F. result in subjecting filtration equipment to rapid failure. Commercial devices for hot gases such as cyclones, are useful for removing larger particulates but are of limited value in removing particulate smaller than 5 to 10 microns.

Porous filters of a cordierite material are known in the art. U.S. Pat. No. 4,257,810 to Narumiya relates to a porous body having a three dimensionally network cellular structure with a plurality of interconnected voids which is made by impregnating an an open cell, flexible polyurethane foam with a ceramic slurry. U.S. Pat. No. 4,396,565 to Tomita relates to filter for exhaust gases formed by immersing a urethane structure into a slurry and subsequently firing to form interconnected. U.S. Pat. No. 4,416,675 to Montierth relates to a honeycomb filter which can be formed by burning out a fugative additive to provide interconnected open porosity in the thin walls of the sintered material.

Cordierite ceramic heat recuperators employing a ceramic cross-flow configuration are known. U.S. Pat. No. 4,130,160 to Dziedzic et al relates to one such structure. U.S. Pat. No. 4,235,855 to Cleveland relates to a process for forming synthetic cordierite ceramic bodies.

The prior art does not concentrate on a method of making a cordierite ceramic filter element having a porous membrane for removing small particulates from a combusted hydrocarbonaceous material. Their is a need improved techniques for making a cordierite ceramic filter element of the above type.

SUMMARY OF THE INVENTION

The present invention is directed to a cordierite ceramic filter element having a porous membrane for removing small particulates from a combusted hydrocarbonaceous material.

In the present invention, a filter structure has a specific configuration for enhancing strength while permitting installation in a housing for a filter.

Heretofore, filter structures of the cordierite type required that a one-half to five eights inch cut be made along the entire marginal sides staring approximately three quarters of an inch from the outlet end. It is an object of the present invention to increase the surface area available for bonding to enhance the strength of the finally assembled filter structure.

In accordance with the present invention, there is provided a cordierite ceramic filter structure having rectangular shaped opposite ends and sides extending intermediate said ends and adjacent thereto, said filter structure being of the type having a plurality of clean gas channels forming outlets at one end thereof, said one end including a flange for mounting said ceramic filter structure in a housing. a plurality inlet channels forming inlets on said side surfaces for gas to be filtered, and thin porous sections separating said inlet channels from said outlet channels for removing particulate from said gas to be filtered, said filter structure comprising a plurality of stacked rectangular shaped ceramic filter elements, each of said elements consisting of magnesium aluminum silicate having the composition in weight percent within the range of about 13 to 16 weight percent MgO, 30 to 36 weight percent $Al_2O_3$ and 49 to 54 percent $SiO_2$, each of said elements comprising a pair of marginal side portions extending legthwise and a plurality of lengthwise extending ribs intermediate said pair of marginal side portions, said thin porous sections joining and extending between said respective ribs and said marginal side portions, said elements being stacked in an alternating manner whereas said ribs of alternate elements are at right angles whereby said inlet channels cross with said outlet channels, said marginal sections on opposite sides extending legthwise and having a serrated surface for bonding to an adjacent element of substantially uniform width of greater than about 1 inch, each of said side surfaces having a vertically extending notch forming said flange for mounting said filter structure in a housing whereby a unitary filter structure is formed having said inlets and outlets for respective dirty and clean gases.

DETAILED DESCRIPTION OF THE PREFERRED EMBODIMENTS

Figure 1:
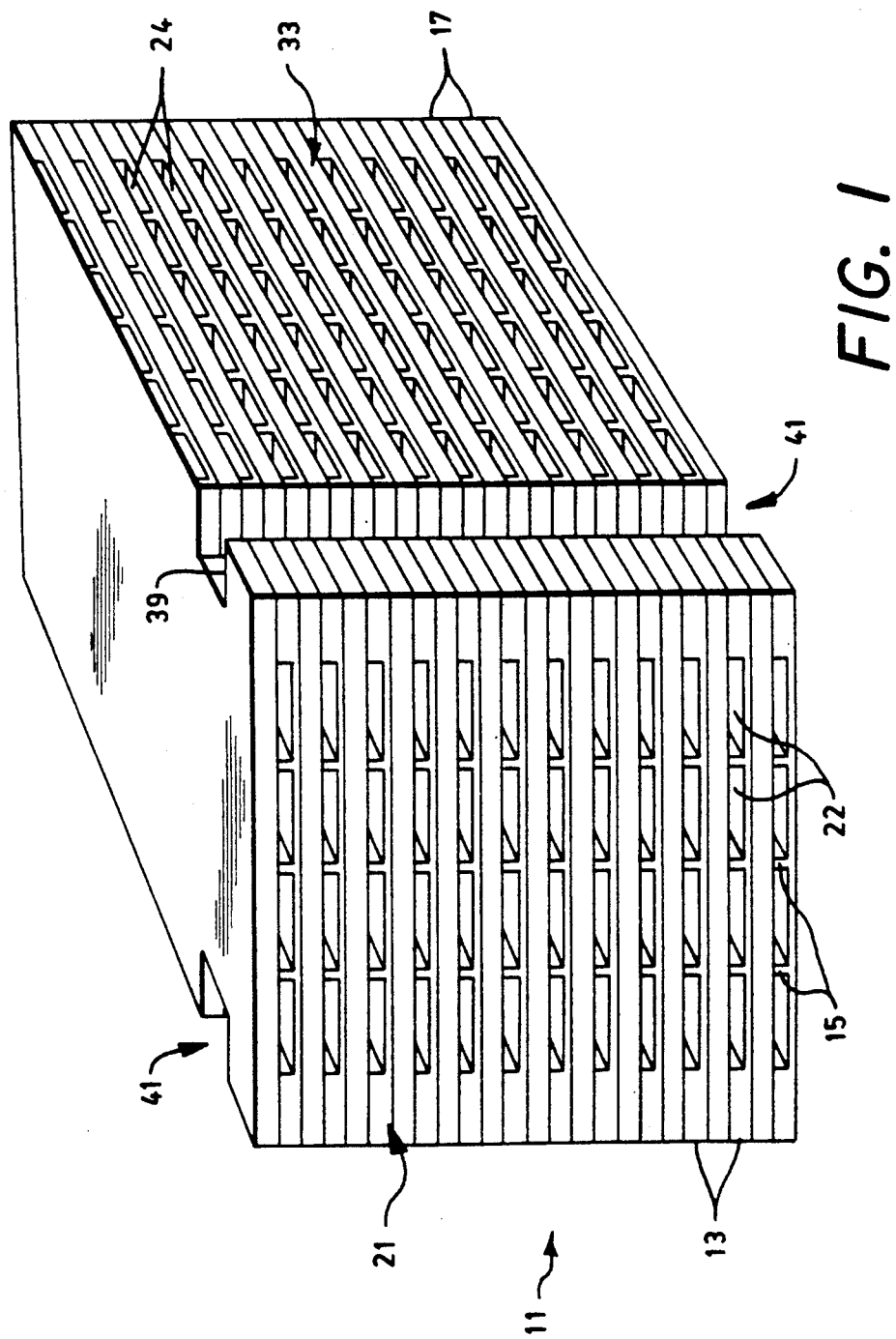
FIG. 1 illustrates a filter structure for removing particulate from a combusted hydrocarbonaceous material.

Referring to FIG. 1 of the drawings, there is showing a filter structure 11 for removing particulate from a combusted hydrocarbonaceous material. The filter structure 11 includes a plurality of clean channel filter elements 13. Each of the elements 13 includes a plurality of longitudinally extending ribs 15 forming channels for the passage of clean or filtered gaseous material. A plurality of dirty channel filter elements 17 include a plurality of widthwise extending ribs 19 forming channels for the passage of the dirty or combusted hydrocarbonaceous material. Although the FIG. 1 shows five ribs 19 for element 17 and three ribs 15 for element 13, preferably element 17 has twelve of the ribs 19 and preferably element 13 has five of the ribs 15. The clean channel and dirty channel filter elements 13, 17 are alternatively stacked so as to form the filter structure 11 as shown in FIG. 1.

The filter structure 11 is made up of a plurality of stacked elements 13,17 positioned so that the alternating ribs 15,19 of the layered filter structure 11 are transversed to one another. As shown, the ribs 15 of the clean channel filter element 13 are visible from an clean gas exit end 21. The opposite end (not shown) is plugged so dirty gaseous material cannot enter the clean air channels. The dirty gaseous material enters the filter structure 11 through side 33 and the opposite side (not shown). A plurality of inlets 24 are shown associated with side 33. With the ribs 15 at a right angle to the ribs 19, the dirty air flows into side 33 and its opposite side and exits as a filtered gas through exit end 21 and outlets 22.

Figure 2:
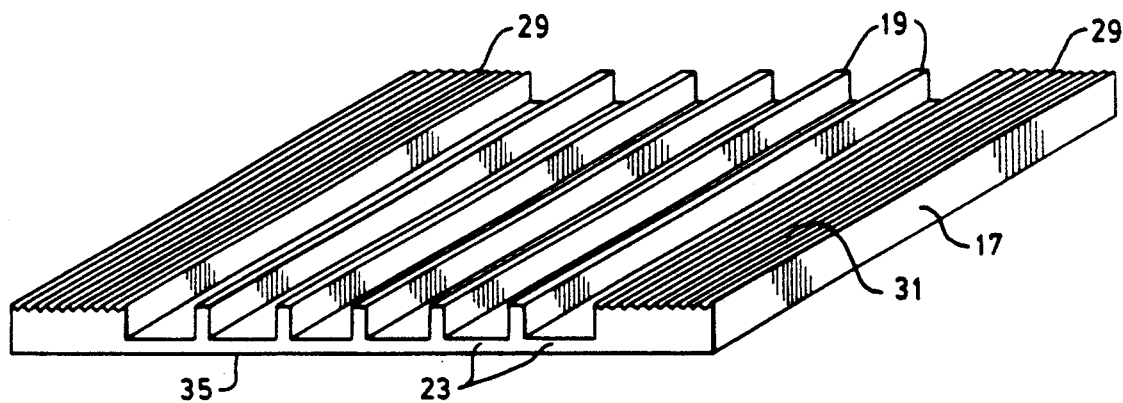
FIG. 2 illustrates a filter element having three longitudinally extending ribs with outlet channels for filtered gases.
Figure 3:
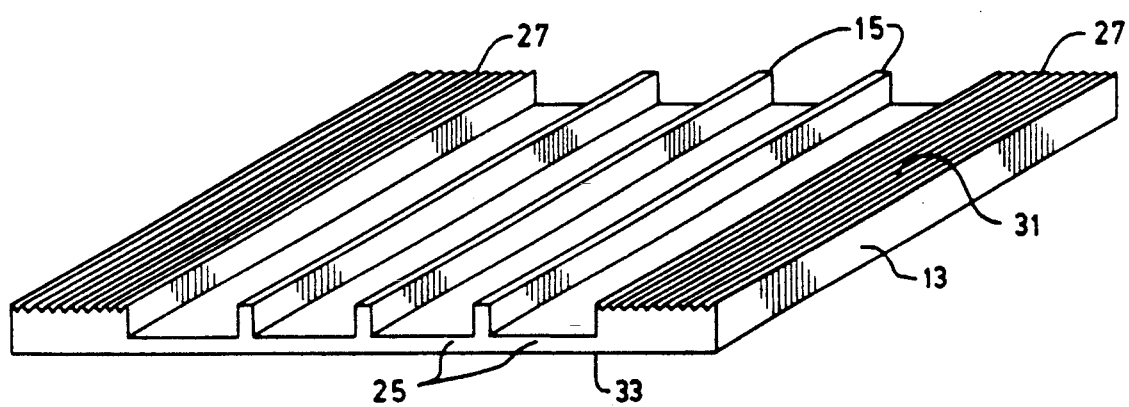
FIG. 3 illustrates a ribbed filter element for dirty or particulate laden gases.
Figure 4:
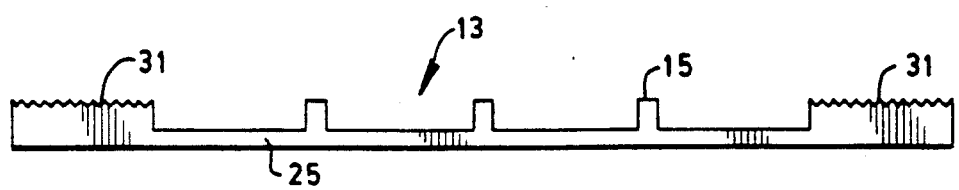
FIG. 4 is a side view of the filter element of FIG. 3.

FIG. 2 illustrates a dirty channel filter element 15 which includes porous section 23. Similarily, FIG. 3 illustrates a clean air channel filter element 13 which includes porous section 25. Each of the filter elements 13,17 which is substantially rectangularly shaped includes respective porous sections 23 and 25. Particulate is retained on the dirty channel side of the respective porous sections 23,25 permitting clean gas to flow into and through the clean gas channels. As illustrated in FIGS. 2 and 3, the sections 23,25 are positioned between respective sets of ribs 19 and 15. The porous sections 23,25 have pores adapted for removing small particles from combusted hydrocarbonaceous material while permitting the passage of a clean gaseous portion. Thus, dirty gaseous material under pressure passes into the clean air channels from the dirty air channels.

Each of the filter elements 13,17 includes respective marginal side portions 27,29 which present a surface for adherence for elements 13 and 17 to another element. Each of the marginal side portions 27,29 includes serrations 31. It is desirable that the respective elements 13,17 of the final filter structure 11 be securely bonded together to form an integral structurer so as to withstand the rigorous operating conditions. During operation, a gaseous back pressure is utilized to clean accumulations of particulate from the porous sections 23,25. This back pressure tends to cause the filter elements 13,17 to separate one from the other. The marginal side portions 27,29 are provided with sufficient surface area to enhance the bonding of the elements 13,17 and prevent premature failure during back pressure cleaning. The marginal side portions 27,29 and the ribs 15,19 of each of the elements 13,17 are of the same height. This permits the formation of sealing contact with the flat bottom surfaces 33,35 of an adjacent filter element 13,17 so as to permit the formation of top and bottom surfaces of the respective channels. When the filter elements 13,17 are stacked, the serrations 31 in the marginal portions 27.29 of one of the elements 13,17 face one of the flat bottoms 13,17 of an adjacent filter element to present a surface which is capable of being sealed by the application of an appropriate cement.

As illustrated in FIG. 1, the filter structure 11 includes a flange 39 for mounting the structure 11 to or in a housing (not shown). The flange 39 is in the shape of a notch 41 which extends vertically adjacent end 21. To form the notch 41, the serrated marginal portion 27 of the clean channel filter elements 13 are notched prior to assembly. The notch 41 interrupts the serrated marginal portion 27 which otherwise has a uniform width. The notch 41 is preferably three quarters of inch deep and has a depth of three quarters of an inch. Preferably the notch 41 is positioned three quarters of inch from the end 21 so as to form an uninterupted flange 39.

A prior art filter structure is shown in U.S. Pat. No. 4,343,631 to Cliberti. Instead of caps, corrugations, and flat membranes which are separate pieces integrated into a filter structure, the present invention utilizes separate filter elements which has the ribs and marginal sections as a integral part of the porous section so as to form a unitary structure. In operation, the filter structure of the present invention operates in a similar manner. Dirty gasses at an elevated pressure enters the filter through a face 18, flows through dirty inlet channels 22 formed by the ribs, permeates the porous section 13,17, and enters outlet channels 24 formed by the flat side of the filter. The gas changes direction by 90 degrees and exits the filter at an adjacent face. Fine particulates contained in the gas are retained as a dust on the higher pressure side of the porous member and may also be retained on the ribs.

As previously mentioned the filter elements are arranged in stacked relationship so as to form channels with the marginal side portions of alternate filter elements are secured to the adjacent filter element a ceramic cement. The ceramic cement is of a material that will form a plastic state flowing into separations in the bonding surfaces to achieve an adequate seal between the filter elements period. Preferably, the cement is a cordierite material which will sinter to form a bond between the filter elements when the stacked filter structure is sintered.

The individual filter elements are formed by extruding a cordierite filler containing composition through a die having a cross sectional opening conforming to the desired shape of the serrated marginal section, ribs, and thin porous sections. The resulting extruded sections are stacked with the cement being utilized along the marginal sections to seal one section to the other before sintering. Next, the entire filter structure is sintered to the consolidated body at a sufficient temperature and for a sufficient period of time to remove the pore forming portion and form a stackable cordierite ceramic filter element.

The starting materials for the cordierite forming portion comprises a mixture of talc, clay and alpha alumina which upon sintering will yield an appropriate cordierite composition. The clay is preferably a ballclay and the alumina is preferably a reactive form of alumina such as alpha alumina. Although starting materials may be any mixture of synthetic powders or naturally occurring minerals formulated to give an approximate stoichiometric cordierite composition upon heating to sintering temperatures. The presence of impurities which tend to lower the melting point of reactance to stabilize a gas base, or to impede crystalization in some other way are detrimental to obtaining the desired low thermal expansion coefficient of the body. In general, the cordierite forming portion of the starting powder composition may have the composition as set forth in U.S. Pat. No. 4,235,855 and in U.S. Pat. No. 4,130,160 the specifications of which are incorporated herein by reference.

The pore forming portion of the sinterable composition preferably comprises from about 87 to about 93% by volume walnut shells and from about 7 to about 13% by volume wood flour. The resulting thin porous sections of sintered cordierite has a permeability, less than about 5 Darcy, more preferably the permeability is less than about 2 Darcy. A discussion of the Darcy equation for the flow of a gas through a porous media is $K = UQL/A(P_{in} - P_{out})$ wherein K = permeability in Darcy, u = viscosity of fluid in centerpiece, Q = volume flow rate in cm$^3$/sec, L = length or thickness of sample in cm, A = cross-sectional area of sample in cm$^2$, Pin = inlet pressure in atmospheres, Pout = outlet pressure in atmospheres.

The shape and morphology of the walnut shells and wood flour were observed using optical and scanning electron microscopy. The walnut shells exhibited a typical morphology of uniform in diameter, straight, smooth surfaced, and free of distortion. The wood flour exhibited a typical morphology of uniform in diameter particles.

The pore forming portion is blended with the cordierite forming portion so that the pore forming portion comprises about 37 to about 43% by volume with the remaining portion comprising the cordierite forming portion. The finally produced filter element desirable has a sufficient strength to withstand the back pressuring cycle typically associated in the operation of the filter elements. The use of an excessive amount of pore forming material results in a weakening of the porous section while the use of an insufficient amount undesirably reduces the permeability of the resulting filter element. The densified filter element of the present invention comprises cordierite with uniformly distributed pores.

The resulting mixture is thoroughly blended in a high speed blender and then mixed with a binder for forming an extrudable mixture. The organic binder is selected to impart strength, typically referred to as green strength, to a cold compacted shape. Illustrative binders that are used include acetates, waxes and resins which are added to give green strength to a compact prior to sintering and to aid in pressing by a lubricating action. Paraffin type waxes which are insoluble in water are typically incorporated into grade powders by use of an organic solvent. Other techniques known in the art utilize water as a vehicle to introduce binders to give green strength. The organic solvent or water is removed by drying methods. The binder material preferably comprises an aqueous solution of triethylene glycol, polyethylene glycol and hydroxyethyl cellulose.

In preparing the final article, the final powder mixture is extruded through a rigid mold cavity. According to methods commonly employed in the art, the mold cavity is equipped with the pressure applying means. The pressure may be applied by a variety of means. However, hydraulic, pneumatic or mechanical pressure means are usually used. Typical pressures usually range from 5 to 60 tons per square inch depending on the size and shape of the compact.

The resulting green part is sintered at temperatures and pressures known in the art to form a densified ceramic. Typically, sintering is performed under vacuum conditions and at temperatures from about 1350 degrees to 1600 degrees Centigrade for a time of about 30 to 150 minutes.

EXAMPLE 1

The following equipment is utilized: Erich Blender, digital scales (50# Capacity), 3 gallons stasinless kettles, 2 inch putty knife, rubber spatula, fox tail brush, sand shaker, 100 mesh sieve, timer, respirator, torrid dust collector, 30 Gallon Lever Pac. The raw material list includes Staywhite Talc (magnesium silicate) from Cyprus Industries, 2435 Military Avenue, Los Angeles, Ca.; aluminum oxide (Alcoa A-16 Super Ground) from Whittaker, Clark & Daniels, 1000 Coolidge Street, South Plainfield, N.J. 07080; Pyrax 13 (Hydrous Aluminum Silicates) (Pyrophyllite-Wagner talc) Charles A. Warner, Inc., 4455 North 6th Street, P.O. Box 9816, Philadelphia, Penna. 19140, telephone number 214/457-0600; Ball-Clay (M-23 Tennessee Ball Clay), Old Hickory Clay, Route 2, Box 303, Mayfield, Ky. 42066, telephone number 502/247-3042; Natrosol [Hydroxyethyl cellulose (polymer)], Hercules, Inc., 910 Market Street, Wilmington, De. 19899, telephone number 302/656-9811; Polyox [Polyethylene oxide (resin)]; Union Carbide Corporation, Chemical and Plastics, 308 Harper Drive, Moorestown, N.J. 08057, telephone number 215/923-2300; T.E.G. Triethylene Glycol, Ashland Chemical Company, 3 Broadway, Binghamton, N.Y. 13902; #325 Walnut Shell (Filler Material), Composition Material of America, Inc., P.O. Box 11600, Montgomery, Ala. 36111.

Begin by first screening at least 10,000 grams of #325 walnut shell filler in a 100 mesh sieve. This will remove any large agglomerates found in the walnut shell. It is recommended that a respirator be worn during blending, screening, and mixing operations. Next weigh out the following ingredients on the digital scales. Placing each one in the Erich blender as they are weighed:

| | |
|---|---|
| Stearwhite Talc | 8636 g |
| Alumina | 5291 g |
| Pyrax B Talc | 4121 g |
| M-23 Ball Clay | 3198 g |
| Natrasol | 1870 g |
| Polyox | 627 g |
| #325 Walnut Shell | 6374 g |
| #80 Wood Flour | 708 g |

The following is a break-down of the materials according to the following categories.

| Cordierite Forming Materials | | | | |
|---|---|---|---|---|
| Talc, S2000 | 8636 | 40.65% | | |
| Talc, P13 | 4121 | 19.40% | | |
| Ball Clay, Tenn. | 3198 | 15.05% | | |
| Alumina | 5291 | 24.90% | | |
| Total Inorganics | 21246 | 100.00% | 75.00% | 59.06% |
| Fillers | | | | |
| Walnut Shell | 6374 | 90.00% | | |
| Wood Flour | 708 | 10.00% | | |
| Total Fillers | 7082 | 100.00% | 25.00% | |
| Total Inorg. & Filler | 28328 | | 100.00% | 78.74% |
| Binders | | | | |
| Natrasol | 1870 | | | |
| Polyox | 842 | | | |
| TEG 610 | | | | |
| Water | 4325 | | | |
| Total Binders | 7647 | | | |
| Overall Total | 35975 | 100.00% | | |

Place all the above ingredients into the Erich Blender and close the lid. Also along with the use of a respirator, turn on the torrid dust collector while the raw material is being dumped into the Erich blender. At normal speed run the Erich blender in a clockwise rotation for 3 minutes (use timer). Stop the blender and then run the blender in a counter-clockwise rotation for 2 minutes.

In a stainless steel 3 gallon kettle weigh out (first taring it to 0) 4.325 kilo of $DiH_2O$. Now weigh out 610 grams (or 540 ml by volume) of T.E.G. into a graduated cylinder.

Next weigh out 215 grams of Polyox powder into a 3000 ml plastic graduated cylinder. After you have done this then add to the Polyox and beaker the 610 grams of T.E.G. while stirring the Polyox powder as the T.E.G. is being added.

After all the Polyox has gone into solution with T.E.G., then pour the solution (T.E.G. and Polyox) into the 4.325 kilo of DiH$_2$O again while stirring the DiH$_2$O. Use the rubber spatula to scrape out all the T.E.G. and Polyox that is contained in the 3000 ML beaker.

We now have what is referred to as a wet binder solution. The wet binder solution can be made up anytime prior (from 1 hour to 1 week) before being added to the Erich blender.

The wet binder solution is ready to be added to the Erich blender. Before opening the door on the Erich blender to add the wet binder solution first strike the door with a rubber mallet to loosen any dried material stuck to the door. After opening the door then brush down with the fox tail brush any dry material that is stuck to the sides and top of the Erich.

Now add the wet binder solution to the Erich blender. We need a total of 7956 grams or 26% of wet binder per batch. Pour the solution directly into the dry powder and again scrape all wet binder material from the 3 gallon stainless steel container.

Close door and set Erich blender to a counter-clockwise rotation. Set timer for 10 minutes. After Erich has run for 10 minutes in a counter-clockwise rotation then stop Erich. Now set Erich to run in a clockwise rotation. Open the door again on the Erich and brush down any loose material on sides and top. Also, use the 2" putty knife to scrape the sides and top of the blender. Restart and allow Erich to operate until the material begins to clump up and makes a pounding sound. Another indication will be the amperage on the Erich will exceed 20 amps on rotor meter located on the control panel. This is an indication that the material is at the correct viscosity and is ready to be dumped from the Erich.

To empty out the Erich place a 36" by 55" plastic bag inside of a 30 gallon lever pac. The lever pac and bag is then placed under the Erich. Turn the Erich on in a clockwise rotation and then open door on bottom of Erich emptying the material into the plastic bag. The plastic bag will contain some 34 kilo or around 75 pounds of batches pre-extruded blend. The easiest way to handle the batched blend is to wheel the lever pac containing the blend to the pallets that are used in filling the extruder. Simply tip the lever pac onto the pallet and pull the bagged batch from the lever pac onto the pallet.

Allow batched material to remain in plastic bag for at least 24 hrs. before you begin to extrude.

PRE-EXTRUSION

It is necessary to pass the mix through the extruder once for mixing purposes. Load the material into the extruder and extrude through any 12 inch production die. Store in plastic bags until ready for final extrusion.

FINAL EXTRUSION

Four different extrusion shapes are needed to build the filter: clean-side sheets, dirty-side sheets, flat sheets, and end blanks. The first three are made on the production extruder. The end blanks are hand extruded.

The procedure for the sheets made on the large extruder is as follows. Load the extruder as per standard operating procedure. Mount the appropriate die and adjust extrusion pressure until extruded sheets are flat. Cut the sheets at the following lengths:
Clean-side sheets—13 inches.
Dirty-side sheets—6 inches.
Flat sheets—6 inches.

Air dry the sheets for 45 minutes, then dry at 135° C. for 45 minutes.

For the hand extruded sections, mount the end-blank die. Load the extruder and adjust extrusion pressure until extruded sheets are flat. Cut into 5 inch section and air dry.

FABRICATION

The fabrication involves alternately stacking the dirty and clean side sheets to form a rough filter which is machined to its final size prior to firing.

The first layer is a clean side channel. Each clean side channel has on end blocked. The end-blank pieces are used for this. The inner ribs of one end of each clean-side channel are removed $\frac{1}{8}$ inch from the end. An end-blank piece is coated with the bonding material and placed at the location of the removed ribs. The ribs are coated with bonding material (snot). (This is the same bonding material used for recuperators.) Coat the ribs of a dirty-side sheet with the bonding material and position on the previously prepared clean-side sheet in the rib-up position.

The above procedure is used, alternately layering clean-side and dirty-side sheets 21 times to produce a filter which is approximately 12 inches high. The final layer is a flat sheet. The assembly is built in a three-sided right angle box to maintain layer alignment. Place a $\frac{1}{4}$ inch stainless sheet on the finished filter. Place two bricks, approximate weight 40 lbs total, on the steel sheet. This weight maintains contact between the layers while the bonding material dries.

Air dry the weighted filter for at least 1/1 hour. Oven dry at 135° C. for at least 24 hours.

MACHINING

The machine step is used to form the flanges necessary for mounting the filter in its end-use application. The flange is on the open end of the narrow portion of the filter. For an extruded filter section having the dimensions 5$\frac{1}{2}$ by 12 inches. A notch or a cut, $\frac{3}{4} \times \frac{3}{4}$ inch spaced $\frac{3}{4}$ inch from the outlet end, is made into the side sections so the finally assembled filter element can be placed in a housing. This configuration increases the total surface area available. As a result, each filter element has a section of the marginal portion of the element cut away so as to form a notch extending entirely along both sides of the filter structure when the elements are stacked. This structure permits attachment of the filter structure to a housing while enhancing the bonding strength between filter elements by increasing the bonding surface area with the extension of total area.

The Bickley furnace is used for firing the filters. The filters are positioned with the layers horizontal. An evenly distributed weight of approximately 10 lbs is placed on each filter. Place each filter on a $\frac{1}{4}$ inch layer of alumina sand. The schedule below will produce a filter with approximately 500 to 1700 Darcy permeability with a minimum of cracking.
Ramp from room temperature to 180° C. in 4 hours.
Hold at 180° C. for 8 hours.
Ramp to 400° C. in 4 hours.
Hold 400° C. for 6 hours.
Ramp to 500° C. in 6 hours.
Hold 500° C. for 2 hours.
Ramp to 1385° C. in 36 hours.
Hold 1385° C. for 4 hours.

Decrease to 1200° C. in 1 hour.
Hold 1200° C. for 2 hours.
Cool to room temperature.

The total time from power-on to power-off is 73 hours. Total time from load to unload depends on the time required for the furnace to cool to room temperature.

Faster firings will produce higher permeabilities, but will also produce more cracks. The firing schedule has been more successful when used in a small box furnace. The Bickley furnace is large and has a high air volume, little of which is displaced by gases liberated during firing. If the schedule is too fast, the filler materials may ignite and induce large thermal stresses in the forming filter. In a small volume furnace, more air is displaced by liberating gases, thus rendering the firing atmosphere lower in oxygen. This reduces the tendency for ignition and cracking.

While there has been shown and discussed what are at present considered the preferred embodiments of the invention, it will be obvious to those skilled in the art that various changes and modifications can be made therein without departing from the scope of the invention as defined by the appended claims.

I claim:

1. A cordierite ceramic filter structure having rectangular shaped opposite ends and sides extending intermediate said ends and adjacent thereto, said filter structure having a plurality of clean gas channels forming outlets at one end thereof, said one end including a flange for mounting said ceramic filter structure in a housing, a plurality inlet channels forming inlets on one said side for gas to be filtered, and thin porous sections separating said inlet channels from said outlet channels for removing particulate from said gas to be filtered, said filter structure comprising a plurality of stacked rectangular shaped ceramic filter elements, each of said elements consisting of magnesium aluminum silicate having the composition in weight percent within the range of about 13 to 16 weight percent MgO, 30 to 36 weight percent $Al_2O_3$ and 49 to 54 percent $SiO_2$, each of said elements comprising a pair of marginal side portions extending lengthwise and a plurality of lengthwise extending ribs intermediate said pair of marginal side portions, said thin porous sections joining and extending between said respective ribs and said marginal side portions, said elements being stacked in an alternating manner whereas said ribs of alternate elements are at right angles whereby said inlet channels cross with said outlet channels, said marginal sections on opposite sides extending lengthwise and having a serrated surface for bonding to an adjacent element of substantially uniform width of greater than about 1 inch, each of said side surfaces having a vertically extending notch forming said flange for mounting said filter structure in a housing whereby a unitary filter structure is formed having said inlets and outlets for respective dirty and clean gases.

2. A filter structure according to claim 1 wherein said thin porous sections have a permeability of less than about 2 Darcy.

3. A filter structure according to claim 2 wherein each element includes a bottom surface and marginal side portions, each marginal side portion being bonded to an adjacent bottom surface.

4. A filter structure according to claim 3 wherein a ceramic cement is forms a bond between respective marginal side portions and bottom surfaces.

* * * * *